United States Patent
Erdem

(10) Patent No.: US 12,528,375 B2
(45) Date of Patent: Jan. 20, 2026

(54) METHOD AND DEVICE FOR PROVIDING CHARGING INFORMATION

(71) Applicant: Bayerische Motoren Werke Aktiengesellschaft, Munich (DE)

(72) Inventor: Caglayan Erdem, Augsburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 391 days.

(21) Appl. No.: 17/797,972

(22) PCT Filed: Feb. 15, 2021

(86) PCT No.: PCT/EP2021/053663
§ 371 (c)(1),
(2) Date: Aug. 5, 2022

(87) PCT Pub. No.: WO2021/180429
PCT Pub. Date: Sep. 16, 2021

(65) Prior Publication Data
US 2023/0051792 A1  Feb. 16, 2023

(30) Foreign Application Priority Data

Mar. 9, 2020 (DE) ............... 10 2020 106 292.3

(51) Int. Cl.
*B60L 53/00* (2019.01)
*B60L 53/62* (2019.01)
(Continued)

(52) U.S. Cl.
CPC ............ *B60L 53/62* (2019.02); *B60L 53/63* (2019.02); *B60L 53/64* (2019.02); *B60L 53/66* (2019.02);
(Continued)

(58) Field of Classification Search
CPC ............... G06Q 10/00; G06Q 50/00
(Continued)

(56) References Cited

U.S. PATENT DOCUMENTS 9,713,962 B2 * 7/2017 Payne .............. B60L 53/62
2011/0246252 A1 * 10/2011 Uesugi ............ G06Q 10/10
705/7.12

(Continued)

FOREIGN PATENT DOCUMENTS

| DE | 10 2011 087 407 A1 | 6/2012 |
| DE | 10 2013 010 774 A1 | 12/2014 |
| DE | 10 2015 226 479 A1 | 6/2017 |

OTHER PUBLICATIONS

Silipo R. et al., "3 New Techniques for Data-Dimensionality Reduction in Machine Learning—The New Stack", Retrieved from the Internet: https://thenewstack.io/3-new-techniques-for-data-dimensionality-reduction-in-machine-learning/ Aug. 3, 2019 (retrieved on May 6, 2021), pp. 1-15, XP055802012, (15 pages).

(Continued)

*Primary Examiner* — Mustafa Iqbal
(74) *Attorney, Agent, or Firm* — Crowell & Moring LLP

(57) ABSTRACT

A device for providing charging information for a charging process is configured to determine a total set of N data tuples for N different times of a charging time period for the charging process. A data tuple includes values of one or more characteristic variables relating to electrical energy that can be provided in the charging process. Furthermore, the device is configured to reduce the total set of N data tuples to a reduced set of M data tuples, with M<N, and to provide the reduced set of M data tuples for the determination of a charging plan for the charging process.

15 Claims, 2 Drawing Sheets

(51) Int. Cl.
  *B60L 53/63* (2019.01)
  *B60L 53/64* (2019.01)
  *B60L 53/66* (2019.01)
  *G06N 3/00* (2023.01)
  *G06N 3/126* (2023.01)
  *G06Q 10/00* (2023.01)
  *G06Q 10/0631* (2023.01)
  *G06Q 50/00* (2024.01)
  *G06Q 50/06* (2012.01)

(52) U.S. Cl.
  CPC ....... *G06N 3/126* (2013.01); *G06Q 10/06315* (2013.01); *G06Q 50/06* (2013.01)

(58) Field of Classification Search
  USPC ........................................................ 705/7.25
  See application file for complete search history.

(56) References Cited

U.S. PATENT DOCUMENTS

| | | | | |
|---|---|---|---|---|
| 2013/0093393 A1* | 4/2013 | Shimotani | .......... | G01C 21/3469 320/109 |
| 2014/0125281 A1* | 5/2014 | Mitsutani | ................ | B60L 1/003 320/109 |
| 2014/0336965 A1* | 11/2014 | Mori | ..................... | H02J 7/0013 702/63 |
| 2015/0032516 A1* | 1/2015 | Deshpande | ............ | G06Q 50/06 705/13 |
| 2019/0061535 A1 | 2/2019 | Bridges et al. | | |
| 2020/0104966 A1* | 4/2020 | Cella | ..................... | B60W 40/08 |
| 2020/0324665 A1* | 10/2020 | Mackenzie | ............. | B60L 53/22 |

OTHER PUBLICATIONS

International Search Report (PCT/ISA/210) issued in PCT Application No. PCT/EP2021/053663 dated May 18, 2021 with English translation (five (5) pages).

German-language Written Opinion (PCT/ISA/237) issued in PCT Application No. PCT/EP2021/053663 dated May 18, 2021 (seven (7) pages).

German-language Search Report issued in German Application No. 10 2020 106 292.3 dated Feb. 1, 2021 with partial English translation (10 pages).

* cited by examiner

METHOD AND DEVICE FOR PROVIDING CHARGING INFORMATION

BACKGROUND AND SUMMARY OF THE INVENTION

The invention relates to a method and a corresponding device for providing charging information for a charging operation at a vehicle.

An at least partially electrically driven vehicle can be connected to a charging station via a charging cable for a charging operation for charging the electrical energy store of the vehicle. The vehicle can then draw electrical energy from the charging station via the charging cable, possibly in dependence on a charging plan.

Prior to a charging operation, charging information in relation to the electrical energy which can be drawn via the charging station can be provided to the vehicle, in particular via the charging cable. Examples of charging information are the maximum available charging power, the available quantity of renewable electrical energy (for example from a photovoltaic installation), and/or the costs of the electrical energy. The charging information typically varies over time and can be provided for a specific time interval or for an upcoming charging time period (for example for the coming 12 or 24 hours). The vehicle can then use the charging information to determine the charging plan for the charging operation (for example in order to minimize the costs and/or to maximize the proportion of renewable electrical energy).

The transmission and the processing of charging information, in particular in the case of a relatively high time resolution of the charging information, can be associated with a relatively high communications and/or computation complexity, in particular in a vehicle.

The present document is concerned with the technical object of enabling efficient provision of precise charging information in a vehicle.

The object is achieved by the claimed invention.

In accordance with one aspect, a device for providing charging information for a charging operation is described. The device can be, for example, part of a charging station for charging a unit to be charged, in particular for charging a vehicle. Alternatively, the device can be part of a separate backend server (for example when the unit to be charged is charged directly from a socket outlet). The charging information can be sent, for example, via a charging cable to the unit to be charged (for example by way of Power Line Communication, PLC). As an alternative or in addition, the charging information can be sent over a (possibly wireless) communications link, for example WLAN, 3G, 4G or 5G, to the unit to be charged. The charging operation and/or the transmission of the charging information can take place in accordance with ISO 15118. The vehicle may be a (street) motor vehicle, in particular a passenger vehicle or a heavy goods vehicle or a bus or a motorbike.

The device can be designed to determine a total quantity of N data tuples for N different times of a charging time period for the charging operation. In this case, a data tuple can comprise values of one or more characteristic variables in relation to electrical energy which can be provided as part of the charging operation. In particular, a data tuple can characterize the time for which the data tuple is relevant. Furthermore, the data tuple can comprise the values of the one or more characteristic variables for this time. The N data tuples can relate to N different times within the (upcoming) charging time period. The N times can in this case be distributed uniformly over the charging time period. Owing to the total quantity of N data tuples, time-based reference curves can be described for the one or more characteristic variables within the charging time period.

Examples of characteristic variables for a charging operation are: the maximum charging power which can be provided during the charging time period for the charging operation (as a function of time); a tariff (for example a price) at which the electrical energy can be provided during the charging time period for the charging operation (as a function of time); a quantity of renewable energy (for example from a photovoltaic installation) which can be provided during the charging time period (as a function of time); and/or an electrical base load which is effected by one or more other electrical consumers (for example in a household) during the charging time period (as a function of time).

The development over time of the one or more characteristic variables during the (upcoming) charging time period can be used by the unit to be charged (for example by a vehicle) to determine a charging plan which optimizes one or more optimization criteria. Examples of optimization criteria are: the total costs of the charging operation, the proportion of renewable energy for the charging operation and/or the total duration of the charging operation.

The total quantity of N data tuples can be determined by the device possibly by data fusion. In particular, the device can be designed to determine a first temporal sequence of values for a first characteristic variable and a second temporal sequence of values for a second characteristic variable. The temporal sequences can possibly be provided by different sources (for example by a photovoltaic installation or by an energy supplier). In this case, the first temporal sequence and the second temporal sequence can relate at least partially to different times.

The device can be designed to adapt, in particular to interpolate, the first temporal sequence and/or the second temporal sequence in such a way that both temporal sequences relate to a common sequence of times, in particular to a common sequence of N times. The total quantity of N data tuples can then be determined on the basis of the adapted first and second sequences, in particular on the basis of the values for the first characteristic variable which are indicated by the, possibly adapted, first sequence at the sequence of N times and on the basis of the values for the second characteristic variable which are indicated by the, possibly adapted, second sequence at the sequence of N times.

By virtue of such a data function, data tuples for different times can be provided which can be processed efficiently by a unit to be charged in order to determine a charging plan. On the other hand, in particular owing to the adaptation of the temporal sequences for the different characteristic variables to a common time base, the number N of data tuples can be relatively high, for example $N \geq 100$ or $N \geq 400$.

The device can be designed to reduce the total quantity of N data tuples to a reduced quantity of M data tuples, where $M < N$. In this case, the reduced quantity of M data tuples can be determined in such a way that the reduced quantity of M data tuples describes approximated time-based curves for the one or more characteristic variables within the charging time period (by way of which the time-based reference curves for the one or more characteristic variables are approximated). The M times of the M data tuples can be distributed over the entire charging time period. In this case, the M times typically have a nonuniform distribution over the charging time period.

The reduced quantity of M data tuples is preferably determined in such a way that the approximated time-based curves for the one or more characteristic variables deviate as little as possible from the time-based reference curves for the one or more characteristic variables (within the meaning of a specific error measure, for example a mean square deviation). In this case, the deviations or errors for the different characteristic variables can possibly be weighted differently.

The weighting can take place in dependence on the optimization criterion for determining the charging plan. For example, the unit to be charged can communicate to the device the optimization criterion with which the charging plan is intended to be determined, in particular optimized. The reduced quantity of M data tuples can then be determined in dependence on the optimization criterion. In particular, the weighting of the individual characteristic variables in the error measure can be adapted in dependence on the optimization criterion. Thus, the transmission and/or processing efficiency and/or the quality of the charging plans determined can be further increased.

The device can be designed to determine the value for an error measure between the time-based reference curves and the approximated time-based curves for the one or more characteristic variables. The reduced quantity of M data tuples can then be determined (by way of an optimization method) in such a way that the value for the error measure is reduced, in particular minimized. In this case, a selection of M data tuples from the total quantity of N data tuples can take place. Alternatively, possibly M new data tuples can be determined (possibly for new times) by way of which an approximation of the time-based reference curves for the one or more characteristic variables which is as precise as possible is provided.

The device can furthermore be designed to provide the reduced quantity of M data tuples for determining a charging plan for the charging operation. In particular, the device can be designed to send the reduced quantity of M data tuples to the unit to be charged, in particular to a vehicle to be charged, in particular in order to enable the unit to be charged to determine the charging plan. The described device therefore makes it possible for a unit to be charged to determine a charging plan for a charging operation in an efficient and precise manner.

As already set forth above, the device can be designed to select M data tuples from the total quantity of N data tuples in order to determine the reduced quantity of M data tuples. Thus, the reduced quantity of M data tuples can be determined in a particularly efficient manner.

For example, the device can be designed to remove in each case one data tuple from the total quantity of N data tuples iteratively, in particular in successive (N-M) steps, in order to determine the reduced quantity of M data tuples. In one step of the iterative method, in this case a value for an error measure can be determined for each of the data tuples remaining from the total quantity, which error measure indicates the error which is effected by the removal of the respective data tuple. It is then possible, depending on the values of the error measure, for the data tuple to be selected (in particular the data tuple with the low value for the error measure) which is removed in the step. Thus, the reduced quantity of M data tuples can be determined iteratively in a particularly efficient manner.

As an alternative or in addition, the device can be designed to determine the reduced quantity of M data tuples by using a genetic and/or evolutionary algorithm on the basis of the total quantity of N data tuples. Thus, a reduced quantity of M data tuples can be determined which approximates, in a particularly precise manner, the time-based reference curves for the one or more characteristic variables.

The device can be designed to determine the reduced quantity of M data tuples taking into consideration one or more secondary conditions in relation to the one or more characteristic variables. Examples of secondary conditions are: a condition to the extent that the maximum charging power, indicated by the reduced quantity of M data tuples, during the charging time period (i.e., the approximated time-based curve of the maximum charging power) is no greater than the maximum charging power, indicated by the total quantity of N data tuples, during the charging time period (i.e., the time-based reference curve of the maximum charging power); and/or a condition to the extent that the tariff, indicated by the reduced quantity of M data tuples, for electrical energy during the charging time period (i.e., the approximated time-based curve of the tariff for the electrical energy provided) is no lower than the tariff, indicated by the total quantity of N data tuples, for electrical energy during the charging time period (i.e., the approximated time-based curve for the tariff for the electrical energy provided). By virtue of taking into consideration one or more secondary conditions in the determination of the reduced quantity of M data tuples, it is possible to further increase the quality of a charging plan determined on the basis thereof.

In accordance with a further aspect, a method for providing charging information for a charging operation is described. The method comprises determining a total quantity of N data tuples for N different times of a charging time period for the charging operation, wherein a data tuple comprises values for one or more characteristic variables in relation to electrical energy which can be provided as part of the charging operation. Furthermore, the method comprises reducing the total quantity of N data tuples to a reduced quantity of M data tuples, where M<N. The method further comprises providing the reduced quantity of M data tuples for determining a charging plan for the charging operation.

In accordance with a further aspect, a software (SW) program is described. The SW program can be designed to be run on a processor (for example on a control device of a charging station) and to thus implement the method described in this document.

In accordance with a further aspect, a storage medium is described. The storage medium can comprise an SW program which is designed to be run on a processor and to implement the method described in this document.

It should be noted that the methods, devices and systems described in this document can be used both on their own and in combination with other methods, devices and systems described in this document. Furthermore, any aspects of the methods, devices and systems described in this document can be combined with one another in a variety of ways. In particular, the features of the claims can be combined with one another in a variety of ways.

The invention will be described in more detail in the text which follows using exemplary embodiments.

DETAILED DESCRIPTION OF THE DRAWINGS

Figure 1:
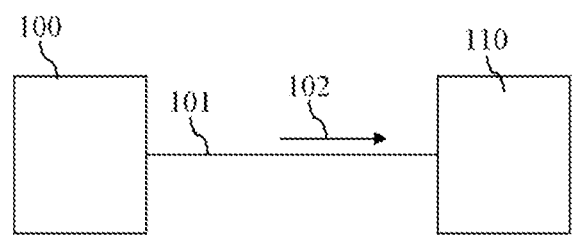
FIG. 1 shows an exemplary charging system having a charging station and a vehicle.

As mentioned at the outset, the present document is concerned with the efficient provision of charging information in relation to electrical energy which can be provided for charging the electrical energy store of a vehicle. In this connection, FIG. 1 shows an exemplary charging system having a charging station 100 and a vehicle 110. The vehicle 110 can be connected to the charging station 100 via a charging cable 101 in order to draw electrical energy for charging the energy store of the vehicle 110.

Prior to a charging operation, charging information 102 can be sent from the charging station 100 to the vehicle 110 (for example via the charging cable). The charging information 102 can then be taken into consideration by the vehicle 110 when generating a charging plan for the charging operation. The charging plan can be determined, for example, on the basis of the charging information 102 with a specific optimization aim or with a specific optimization criterion. Examples of optimization aims are a charging operation which is as cost-effective as possible, as high a use of renewable energy as possible, as quick charging as possible, etc.

Figure 2A:
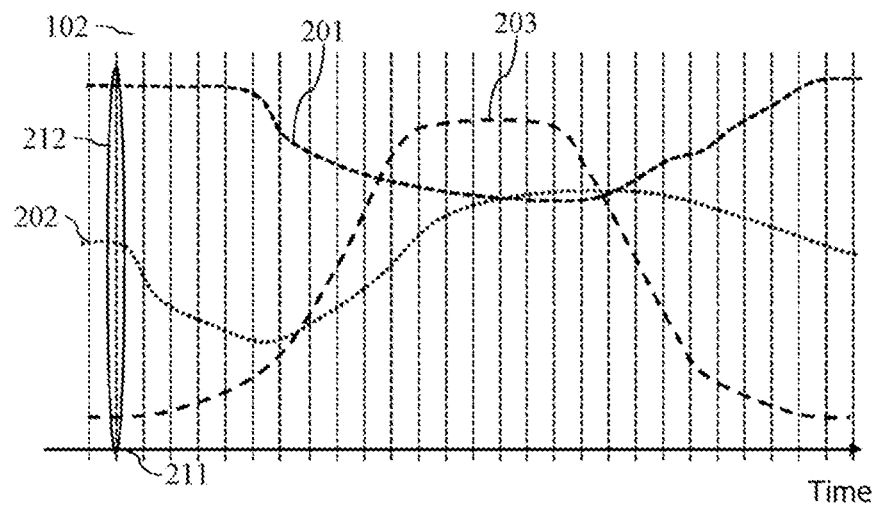
FIG. 2a shows exemplary charging information.

FIG. 2a shows exemplary charging information 102. The charging information 102 can comprise time-based curves for one or more charging characteristic variables 201, 202, 203 (or characteristic variables for short). Examples of charging characteristic variables 201, 202, 203 are:
the maximum possible charging power 201;
the costs 202 for electrical energy; and/or
the quantity 203 of renewable electrical energy available (per unit time).

The time-based curves of the one or more charging characteristic variables 201, 202, 203 can be provided at a plurality of times 211 in temporally sampled fashion. A data tuple 212 can then be provided for each time 211 which
indicates the time 211 to which the data relate; and
comprises values for the one or more charging characteristic variables 201, 202, 203 at this time 211.

The charging information 102 can therefore comprise a sequence of data tuples 212 for a corresponding sequence of times 211. In the case of relatively high temporal sampling, the quantity of data which is transmitted by the charging station 100 to the vehicle 110 and which is then processed by the vehicle 110 can be relatively high.

The charging station 100 can be designed to reduce the number of data tuples 212 which is sent for transmitting the charging information 102 to the vehicle 110. For this purpose, the time resolution of the charging information 102 can be reduced at least temporarily. In other words, the time interval between two successive data tuples 212 can be increased at least temporarily in order to reduce the number of data tuples 212 (for a charging time interval).

The reduction in the number of data tuples 212 can in this case take place in such a way that the error which results in the description of the time-based (reference) curves of the one or more characteristic variables 201, 202, 203 owing to the reduced number of data tuples 212 is kept as small as possible, in particular minimized. The original number of (possibly equidistant in time) data tuples 212 for describing the time-based (reference) curves of the one or more characteristic variables 201, 202, 203 can be N, for example. The charging station 100 can be designed to determine a reduced number M of data tuples 212, where M<N, by way of which as precise a description as possible of the time-based curves of the one or more characteristic variables 201, 202, 203 is still provided.

In this case, possibly one or more secondary conditions can be taken into consideration. Examples of secondary conditions are:
the actual time-based curve of the maximum possible charging power 201 should not be exceeded (in order to avoid a situation whereby a charging plan is determined which cannot be implemented); and/or
the actual time-based curve of the costs 202 for electrical energy should not be undershot (so that the actual costs of the determined charging plan are not higher than the estimated costs).

Let $L(t)=(L_1(t), L_2(t), L_3(t))$ be the time-based (reference) curves of the one or more characteristic variables 201, 202, 203 which are described by the (possibly interpolated) sequence of N data tuples 212, and let $\tilde{L}(t)=(\tilde{L}_1(t), \tilde{L}_2(t), \tilde{L}_3(t))$ be the approximated time-based curves of the one or more characteristic variables 201, 202, 203 which are described by the (possibly interpolated) sequence of M data tuples 212. By using an error measure, the error between the original and the approximated time-based curves of the one or more characteristic variables 201, 202, 203 can be quantified. In this case, the error in the time-based curves for the individual characteristic variables 201, 202, 203 can possibly be weighted differently. An example of an error measure is (for the example of i=3 characteristic variables 201, 202, 203)

$$A=\Sigma_{i=1}^3 w_i A_i, \text{ where } A_i = \int_0^T (L_i(t) - \tilde{L}_i(t))^2 dt$$

where T is the charging time interval for which charging information 102 is transmitted, and where $w_i$ are weightings for the individual characteristic variables 201, 202, 203.

The sequence of M data tuples 212 can be determined in such a way that the value of the error measure A is kept as low as possible, in particular is minimized. In this case, in particular the subset of M data tuples 212 from the quantity of N data tuples 212 can be identified by way of which the value for the error measure A is kept as low as possible, in particular is minimized. This can be effected, for example, by using a genetic algorithm.

In an alternative example, the subset of M data tuples 212 can be determined in such a way that the total quantity of N data tuples 212 is reduced gradually, in (N-M) steps, in each case reduced by a data tuple 212. In this case, in each step, the data tuple 212 can be identified by way of which the lowest rise in the value of the error measure A in the respective step is effected (possibly whilst taking into consideration one or more secondary conditions). The data tuple 212 whose nontransmission causes the lowest rise in the value of the error measure A can then be removed from the respectively remaining quantity of data tuples 212. This method can be repeated in (N-M) steps in order to reduce the total quantity of N data tuples 212 to a subset of M data tuples 212.

Figure 2B:
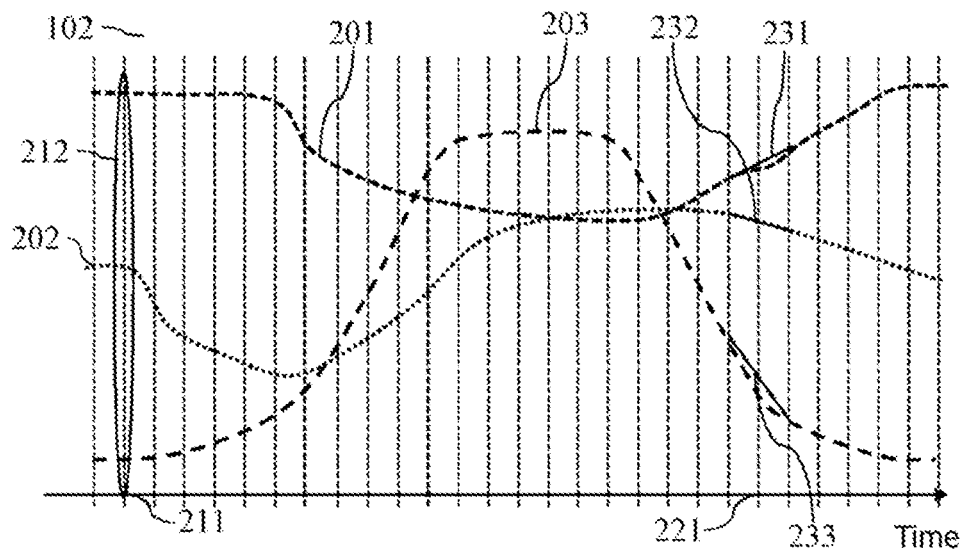
FIG. 2b shows exemplary charging information with a reduced time resolution.

FIG. 2b illustrates by way of example how the nontransmission of the data tuple 212 for the time 221 affects the time-based curve of the one or more characteristic variables 201, 202, 203 in the vicinity of the time 221. In this case, the time-based curves can be interpolated, for example, by linear segments 231, 232, 233 in order to bypass the nontransmitted data tuple 212.

In this document, measures are therefore described with which, for example using the charging standard ISO15118 between the charging station 100 and a vehicle 110, charging information 102 (for example as a prompt for a charging operation) can be provided by the charging station 110. By using the charging information 102, for example, particularly favorable and/or less favorable charging time ranges and/or time ranges with relatively high or relatively low maximum charging powers can be identified. The charging information 102 can be collected in the charging station 100 and then sent to the vehicle 110. The vehicle 110 can then generate an optimized charging plan on the basis of the charging information 102.

The charging station 100 can be designed to amalgamate the different components of the charging information 102, in particular the different time-based curves of the different characteristic variables 201, 202, 203. For this purpose, the different time-based curves can be sampled with common temporal sampling so that in each case one data tuple 212 can be provided at a sequence of N times 211 which in each case comprises the values for all characteristic variables 201, 202, 203 to be transmitted (for the respective time 211).

For example, various input information and/or characteristic variables 201, 202, 203 (for example the maximum charging power, the base load (for example in the household in which the vehicle 110 is being charged), tariff information in relation to electricity tariffs, the solar production (as an example of the availability of renewable energies)) can be provided to the charging station 100. These characteristic variables 201, 202, 203 can be present in separate tables, for example. The tables can be combined and passed on for common time sampling (for example for time sampling which corresponds to the highest common denominator of the individual tables). Therefore, time sampling can be used which corresponds to the superset of the individual input tables. For the superimposition of the input information, possibly additional sampling can be generated in the respective other tables as soon as, for example, a power value or a tariff of a table changes substantially.

The quantity of data tuples 212 amalgamated in this way can comprise, for example, N=400 or more data tuples 212. On the other hand, the subset of data tuples 212 which can be transmitted and/or can be processed by the vehicle 110 can be restricted to, for example, M=12 data tuples 212. In general, for M: M≤50 or M≤20.

The charging station 100 can be designed to compress the charging information 102 transmitted to the vehicle 110, in particular in order to reduce the required data rate for the data transmission and the computation and storage resources of the vehicle 110. In this case, individual data tuples 212 can be omitted or can be removed from the quantity of data tuples 212. The error in the energy and/or in the prices which is brought about by the omission of a temporal sampling, i.e. of a data tuple 212, can be calculated. The data tuple 212 with the fewest errors can be deleted. This process can be repeated iteratively until the desired number M of data tuples 212 is present.

Figure 3:
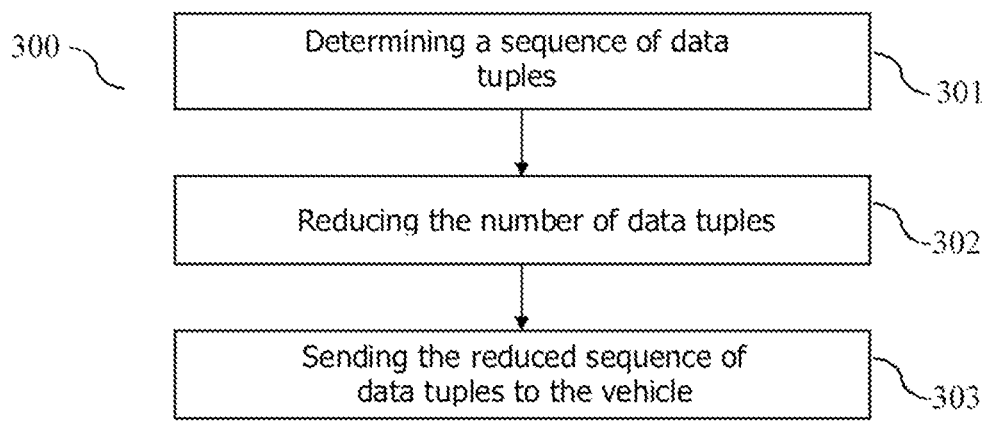
FIG. 3 shows a flowchart of an exemplary method for providing charging information.

FIG. 3 shows a flowchart of an exemplary (computer-implemented) method 300 for providing charging information 102 for a charging operation. The charging information 102 can in this case comprise data tuples 212 which describe the time-based curve of one or more characteristic variables 201, 202, 203 for the charging operation. The method 300 can be implemented by a charging station 100.

The method 300 comprises determining 301 a total quantity of N data tuples 212 for N different times 211 of an (upcoming) charging time period or charging time interval for the charging operation. The N times 211 can be distributed (for example equidistantly) over the entire charging time period. The individual data tuples 212 can in each case comprise values of one or more characteristic variables 201, 202, 203 in relation to electrical energy which can be provided as part of the charging operation. Therefore, time-based (reference) curves of the one or more characteristic variables 201, 202, 203 during the charging time period can be described by the total quantity of N data tuples 212.

Furthermore, the method 300 comprises reducing 302 the total quantity of N data tuples 212 to a reduced quantity of M data tuples 212, where M<N. The reduction can in this case take place in such a way that the error between the time-based (reference) curves of the one or more characteristic variables 201, 202, 203 which are described by the total quantity of N data tuples 212 and the approximated time-based curves of the one or more characteristic variables 201, 202, 203 which are described by the reduced quantity of M data tuples 212 is reduced (at least on average), in particular minimized.

The method 300 further comprises providing 303 the reduced quantity of M data tuples for determining a charging plan for the charging operation. In this case, the reduced quantity of M data tuples 212 can in particular be sent to a vehicle 110 in order to enable the vehicle 110 to determine a charging plan for the charging operation on the basis of the reduced quantity of M data tuples 212. The electrical energy store of the vehicle 110 can then be charged in dependence on the determined charging plan during the charging time period.

By virtue of the measures described in this document, it can be made possible for a vehicle 110 to determine a charging plan for a charging operation in an efficient and precise manner.

The present invention is not restricted to the exemplary embodiments shown. In particular, it should be noted that the description and the figures are only intended to illustrate the principle of the proposed methods, devices and systems by way of example.

The invention claimed is:

1. A system comprising:
a unit configured to be charged with electrical energy;
a charging station that charges the unit with the electrical energy;
a charging cable configured to deliver the electrical energy from the charging station to the unit; and
a device configured to provide charging information associated with a charging operation of the unit, wherein the device is configured to:
determine a total quantity of N data tuples for N different times of a charging time period for the charging operation, wherein a data tuple comprises values of one or more characteristic variables in relation to electrical energy which is providable as part of the charging operation;
reduce the total quantity of N data tuples to a reduced quantity of M data tuples, wherein M<N; and
provide the reduced quantity of M data tuples for determining a charging plan for the charging operation, wherein
the total quantity of N data tuples describes time-based reference curves for the one or more characteristic variables within the charging time period;
the reduced quantity of M data tuples describes approximated time-based curves for the one or more characteristic variables within the charging time period; and
the device is further configured to:
determine a value for an error measure between the time-based reference curves and the approximated time-based curves for the one or more characteristic variables, determine the reduced quantity of M data tuples such that the value for the error measure is reduced, wherein the error measure is calculated using a mean square deviation, and enable the unit to control charging based on the charging plan.

2. The system according to claim 1, wherein the device is further configured to determine the reduced quantity of M data tuples such that the value for the error measure is minimized.

3. The system according to claim 1, wherein the device is further configured to select M data tuples from the total quantity of N data tuples in order to determine the reduced quantity of M data tuples.

4. The system according to claim 1, wherein the device is further configured to remove in each case one data tuple from the total quantity of N data tuples iteratively in order to determine the reduced quantity of M data tuples.

5. The system according to claim 4, wherein the device is further configured to remove in each case one data tuple from the total quantity of N data tuples in N-M steps.

6. The system according to claim 4, wherein the device is further configured, in one step, to:

determine, for each of the data tuples remaining from the total quantity, a value for an error measure which indicates an error which is effected by removal of the respective data tuple; and select, depending on the values for the error measure, the data tuple which is removed in the step.

7. The system according to claim 1, wherein the device is further configured to determine the reduced quantity of M data tuples by using at least one of a genetic algorithm or an evolutionary algorithm based on the total quantity of N data tuples.

8. The system according to claim 1, wherein the device is further configured to determine the reduced quantity of M data tuples taking into consideration one or more secondary conditions in relation to the one or more characteristic variables; and the one or more secondary conditions comprise at least one of:

a first condition such that a maximum charging power, indicated by the reduced quantity of M data tuples, during the charging time period is no greater than a maximum charging power, indicated by the total quantity of N data tuples, during the charging time period; or a second condition such that a tariff, indicated by the reduced quantity of M data tuples, for electrical energy during the charging time period is no lower than a tariff, indicated by the total quantity of N data tuples, for electrical energy during the charging time period.

9. The system according to claim 1, wherein the one or more characteristic variables comprise at least one of:

a maximum charging power which is providable during the charging time period for the charging operation;

a tariff at which the electrical energy is providable during the charging time period for the charging operation;

a quantity of renewable energy which is providable during the charging time period; and/or an electrical base load which is effected by one or more other electrical consumers during the charging time period.

10. The system according to claim 1, wherein the device is further configured to send the reduced quantity of M data tuples to a unit which is intended to be charged as part of the charging operation, in order to enable the unit to determine the charging plan.

11. The system according to claim 10, wherein the unit is a vehicle.

12. The system according to claim 1, wherein the device is further configured to provide the reduced quantity of M data tuples for the charging operation in accordance with ISO 15118.

13. The system according to claim 1, wherein the device is further configured to:

determine a first temporal sequence of values for a first characteristic variable and a second temporal sequence of values for a second characteristic variable, wherein the first temporal sequence and the second temporal sequence relate at least partially to different times;

interpolate at least one of the first temporal sequence or the second temporal sequence such that both temporal sequences relate to a common sequence of N times; and determine the total quantity of N data tuples based on the interpolated first and second sequences.

14. The system according to claim 13, wherein the device is further configured to determine the total quantity of N data tuples based on the values for the first characteristic variable which are indicated by the, possibly interpolated, first sequence at the sequence of N times and based on the values for the second characteristic variable which are indicated by the possibly interpolated second sequence at the sequence of N times.

15. A method for providing charging information for a charging operation, the method comprising:

providing a unit configured to be charged with electrical energy;

providing a charging station configured to charge the unit with the electrical energy;

providing a charging cable configured to deliver the electrical energy from the charging station to the unit;

providing a device configured to provide charging information associated with a charging operation of the unit;

determining, using the device, a total quantity of N data tuples for N different times of a charging time period for the charging operation, wherein a data tuple comprises values for one or more characteristic variables in relation to electrical energy which is providable as part of the charging operation;

reducing, using the device, the total quantity of N data tuples to a reduced quantity of M data tuples, wherein M<N; and providing, using the device, the reduced quantity of M data tuples for determining a charging plan for the charging operation, wherein the total quantity of N data tuples describes time-based reference curves for the one or more characteristic variables within the charging time period;

the reduced quantity of M data tuples describes approximated time-based curves for the one or more characteristic variables within the charging time period; and the device is further configured to:

determine a value for an error measure between the time-based reference curves and the approximated time-based curves for the one or more characteristic variables, determine the reduced quantity of M data tuples such that the value for the error measure is reduced, wherein the error measure is calculated using a mean square deviation, and enable the unit to control charging based on the charging plan.

* * * * *